No. 756,807. PATENTED APR. 12, 1904.
L. ABRAHAM.
VEHICLE.
APPLICATION FILED JAN. 29, 1904.
NO MODEL.
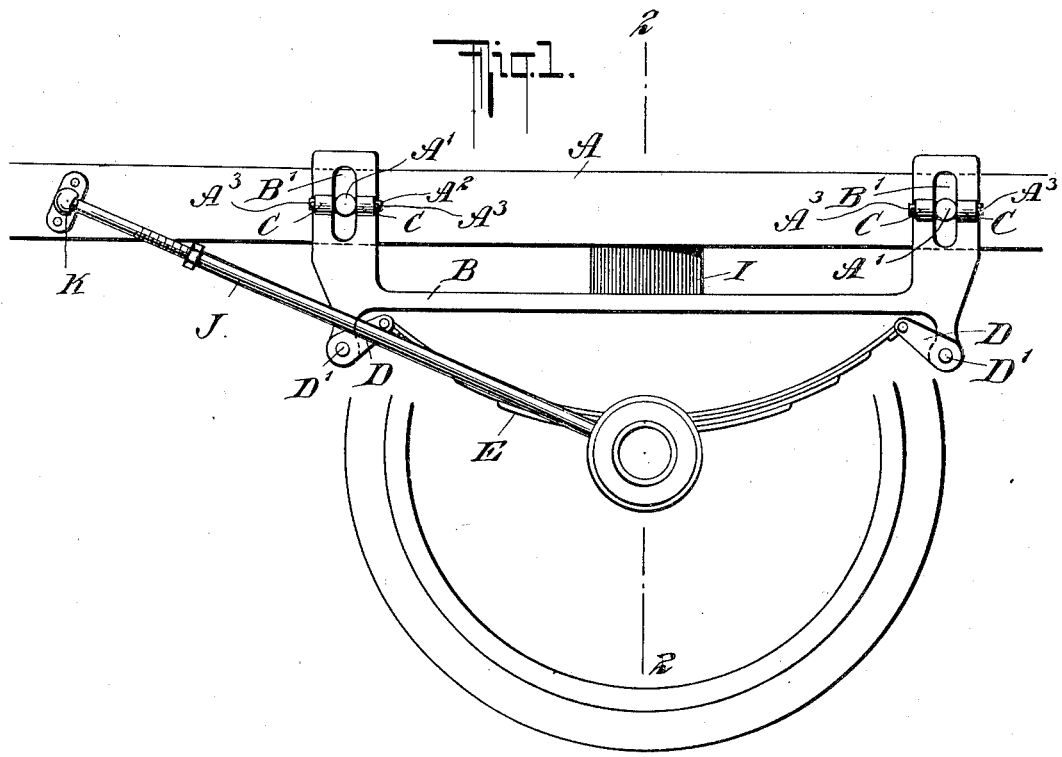
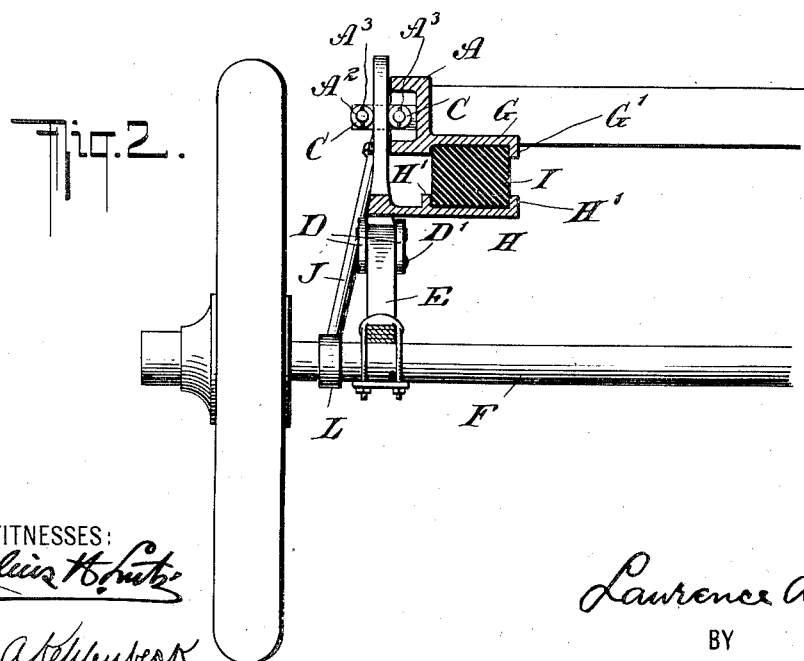
WITNESSES:
INVENTOR
Lawrence Abraham
BY
ATTORNEYS No. 756,807. Patented April 12, 1904.

UNITED STATES PATENT OFFICE.

LAWRENCE ABRAHAM, OF BROOKLYN, NEW YORK.

VEHICLE.

SPECIFICATION forming part of Letters Patent No. 756,807, dated April 12, 1904.

Application filed January 29, 1904. Serial No. 191,119. (No model.)

*To all whom it may concern:*

Be it known that I, LAWRENCE ABRAHAM, a citizen of the United States, and a resident of the borough of Brooklyn, county of Kings, city and State of New York, have invented certain new and useful Improvements in Vehicles, of which the following is a specification.

My invention relates to the suspension of the bodies of vehicles, and more particularly to automobiles, and has for its object to provide a simple and effective device for taking up shocks and jars.

The invention will be fully described hereinafter and the features of novelty pointed out in the appended claims.

Reference is to be had to the accompanying drawings, in which—

Figure 1 is a partial side view of the chassis of an automobile with my invention applied thereto; and Fig. 2 is a partial section of the same, taken on line 2 2 of Fig. 1.

A represents one of the usual side bars of the chassis of an automobile, upon which are cast or otherwise secured studs A'.

B is a movable member arranged at the side of the frame A and provided with slots B', through which project the studs A'. On the said studs A' are mounted in any suitable manner—as, for instance, by a pin $A^2$, running through the studs—friction-rollers C, between which the member B is adapted to move. The purpose of the rollers C is to reduce the friction arising from any movement of the member B which may occur as the vehicle encounters obstructions of any kind. If at any time it is desired to remove the member B from the frame A, it is only necessary to remove the pins $A^3$, which keep the rollers C on their axles $A^2$, thus leaving the rollers free to be removed, and then pulling the axle-pins $A^2$ from the studs A', whereupon the member B may be easily removed from the frame A. To the lower part of the member B are pivoted links D, as at D', to which are attached the usual springs E, the said springs E being secured to the axle of the vehicle in the customary manner.

G is a projection or seat cast or otherwise secured to the inner surface of the side bar A, and H is a corresponding projection or seat cast or secured to the inner surface of the member B. Between the two seats G and H is arranged a cushion I, made of rubber or other resilient material and held in position by lugs G' H' on the seats G H, respectively. Thus as the vehicle encounters obstructions or inequalities in the road of such a small nature that they have no apparent effect on the usual springs E the cushion I, being more sensitive than the said springs E and acting in conjunction with the movable member B, will take up all such small shocks and jars and accordingly save any mechanism which may be supported on the frame A from the wear and tear occasioned by the constant repetition of such small jars.

J is a distance-rod of ordinary construction for taking up any slack in the driving-chains and is secured to the side frame by a ball-and-socket joint K and to the axle by a band L.

It will be understood that the device above described is repeated over each wheel. Various modifications may be made without departing from the spirit of my invention.

What I claim, and desire to secure by Letters Patent, is—

1. A means for suspending the bodies of vehicles, comprising a frame, a movable member adjacent to said frame, and a cushion mounted between the frame and said movable member.

2. A means for suspending the bodies of vehicles comprising a frame, studs upon said frame, a movable member adjacent to said frame provided with slots to receive said studs, a spring having a yielding connection with said movable member and being further connected with the axle of the vehicle, and a cushion between said movable member and the frame.

3. A means for suspending the bodies of vehicles comprising a frame, studs on said frame, a movable member provided with slots to receive said studs, rollers mounted on said studs in engagement with the movable member, and a cushion between the movable member and the frame.

4. A means for suspending the bodies of vehicles, comprising a frame having a seat, a movable member connected with said frame and also provided with a seat, and a resilient device arranged between the seat of the frame and the seat of the movable member.

5. A means for suspending the bodies of vehicles comprising a frame, a movable member connected with said frame, a resilient device between said movable member and said frame, links pivotally connected with said movable member, and a spring connected with said links and the axle of the vehicle.

6. A means for suspending the bodies of vehicles comprising a frame, a member mounted adjacent thereto and movable vertically, means carried by the frame for guiding said member in its vertical movement, means for supporting said member, and a resilient device connecting said frame and member.

In testimony whereof I have signed my name to this specification in the presence of two subscribing witnesses.

LAWRENCE ABRAHAM.

Witnesses:
B. J. CONROY,
JOHN A. KEHLENBECK.